(12) United States Patent
Zheng et al.

(10) Patent No.: US 11,201,342 B2
(45) Date of Patent: Dec. 14, 2021

(54) METHODS FOR FUEL DESULFURIZATION

(71) Applicant: HONEYWELL INTERNATIONAL INC., Morris Plains, NJ (US)

(72) Inventors: Daguang Zheng, Torrance, CA (US); Dacong Weng, Rancho Palos Verdes, CA (US)

(73) Assignee: HONEYWELL INTERNATIONAL INC., Charlotte, NC (US)

(*) Notice: Subject to any disclaimer, the term of this patent is extended or adjusted under 35 U.S.C. 154(b) by 586 days.

(21) Appl. No.: 16/057,385

(22) Filed: Aug. 7, 2018

(65) Prior Publication Data
US 2018/0351188 A1    Dec. 6, 2018

Related U.S. Application Data

(62) Division of application No. 14/953,999, filed on Nov. 30, 2015, now Pat. No. 10,158,138.

(51) Int. Cl.
*H01M 8/0662*    (2016.01)
*H01M 8/04007*    (2016.01)
(Continued)

(52) U.S. Cl.
CPC .......... *H01M 8/0675* (2013.01); *B64D 37/34* (2013.01); *C01B 3/38* (2013.01); *C10G 5/06* (2013.01); *H01M 8/04007* (2013.01); *H01M 8/04097* (2013.01); *H01M 8/04373* (2013.01); *H01M 8/04425* (2013.01); *H01M 8/04738* (2013.01); *H01M 8/0618* (2013.01); *B64D 2041/005* (2013.01); *C01B 2203/0233* (2013.01); *C01B 2203/066* (2013.01); *C01B 2203/067* (2013.01); *C01B 2203/127* (2013.01); *C01B 2203/1235* (2013.01); *C01B 2203/1258* (2013.01); *C10G 2300/202* (2013.01); *C10G 2300/4081* (2013.01); *H01M 8/04201* (2013.01); *H01M 2250/20* (2013.01); *Y02T 90/40* (2013.01)

(58) Field of Classification Search
None
See application file for complete search history.

(56) References Cited

U.S. PATENT DOCUMENTS 7,318,845 B2    1/2008   Shaaban et al.
7,455,923 B2   11/2008   Katikaneni et al.
(Continued)

FOREIGN PATENT DOCUMENTS

DE    102007051469 A1   10/2007
EP         2562408 A1    2/2013
EP         2927130 A1   10/2015

OTHER PUBLICATIONS

USPTO Notice of Allowance for U.S. Appl. No. 14/953,999 dated Aug. 15, 2018.
(Continued)

*Primary Examiner* — Christopher P Jones
*Assistant Examiner* — Phillip Y Shao
(74) *Attorney, Agent, or Firm* — Lorenz & Kopf, LLP

(57) ABSTRACT

A method of fuel desulfurization comprises receiving fuel from a source of fuel in a gaseous phase and condensing the fuel in the gaseous phase in a fuel condenser to convert at least a portion of the fuel into a liquid phase. The method further comprises delivering the fuel in the liquid phase directly to a reformer and returning the uncondensed portion of the fuel in the gaseous phase to the source of fuel to inert the source of fuel.

16 Claims, 4 Drawing Sheets

(51) Int. Cl.
*B64D 37/34* (2006.01)
*C01B 3/38* (2006.01)
*C10G 5/06* (2006.01)
*H01M 8/04089* (2016.01)
*H01M 8/0432* (2016.01)
*H01M 8/0438* (2016.01)
*H01M 8/04701* (2016.01)
*H01M 8/0612* (2016.01)
*H01M 8/04082* (2016.01)
*B64D 41/00* (2006.01)

(56) References Cited

U.S. PATENT DOCUMENTS

| | | |
|---|---|---|
| 8,192,532 B1 | 6/2012 | Gupta |
| 9,016,078 B2 | 4/2015 | Gupta |
| 2007/0012184 A1 | 1/2007 | Duraiswamy et al. |
| 2008/0057366 A1 | 3/2008 | Katikaneni et al. |

OTHER PUBLICATIONS

Extended EP Search Report for Application No. 16198055.2-1360 dated Mar. 14, 2017.

METHODS FOR FUEL DESULFURIZATION

CROSS-REFERENCE TO RELATED APPLICATION

This application is a divisional of U.S. patent application Ser. No. 14/953,999 filed on Nov. 30, 2015. The relevant disclosure of the above application is incorporated herein by reference.

TECHNICAL FIELD

The present disclosure generally relates to systems and methods for desulfurization of a fuel, and more particularly relates to desulfurization of a fuel for use with a fuel cell system.

BACKGROUND

Generally, fuel cell systems employ a hydrogen-rich gas for power generation. Certain fuels, while rich in hydrogen, may also contain sulfur. Fuels with sulfur may form hydrogen sulfide and sulfur oxide during reformation by the fuel cell system. Hydrogen sulfide and sulfur oxide are generally detrimental to fuel reforming units and fuel cell performance, as hydrogen sulfide and sulfur oxide contaminate the reformer and fuel cell catalysts. Certain methods for desulfurization may involve the use of an absorbent, which can add undesirable weight and require routine maintenance to replace the used absorbent.

Accordingly, it is desirable to provide improved systems and methods for fuel desulfurization, which does not require the use of an absorbent, thereby reducing system weight and maintenance requirements. Furthermore, other desirable features and characteristics of the present invention will become apparent from the subsequent detailed description and the appended claims, taken in conjunction with the accompanying drawings and the foregoing technical field and background.

SUMMARY

According to the various teachings of the present disclosure, a fuel cell system is provided. The fuel cell system includes a source of fuel, and a fuel desulfurization system fluidly coupled to the source of fuel to receive the fuel in a gaseous phase. The fuel desulfurization system includes a fuel condenser that condenses at least a portion of the fuel from the gaseous phase to a liquid phase. The fuel cell system includes a reformer fluidly coupled to the fuel desulfurization system that receives the fuel from the fuel desulfurization system in the liquid phase to generate hydrogen enriched fuel and a fuel cell stack fluidly coupled to the reformer to receive the hydrogen enriched fuel.

Further provided is a method of fuel desulfurization. The method comprises receiving fuel from a source of fuel in a gaseous phase and condensing the fuel in the gaseous phase in a fuel condenser to convert at least a portion of the fuel into a liquid phase. The method further comprises delivering the fuel in the liquid phase directly to a reformer and returning the uncondensed portion of the fuel in the gaseous phase to the source of fuel to inert the source of fuel.

Also provided is a fuel cell system. The fuel cell system includes a source of fuel and a fuel desulfurization system including a fuel condenser in fluid communication with a fuel collector. The fuel condenser fluidly coupled to the source of fuel to receive the fuel in a gaseous phase, and the fuel condenser condenses at least a portion of the fuel in the gaseous phase into a liquid fuel that is collected by the fuel collector. The fuel cell system includes a reformer fluidly coupled to the fuel collector to receive the liquid fuel and to convert the liquid fuel to a hydrogen enriched fuel. The fuel cell system also includes a fuel cell stack fluidly coupled to the reformer to receive the hydrogen enriched fuel and the uncondensed fuel in the gaseous phase is returned to the source of fuel to inert the source of fuel.

DESCRIPTION OF THE DRAWINGS

The exemplary embodiments will hereinafter be described in conjunction with the following drawing figures, wherein like numerals denote like elements, and wherein.

DETAILED DESCRIPTION

Figure 1:
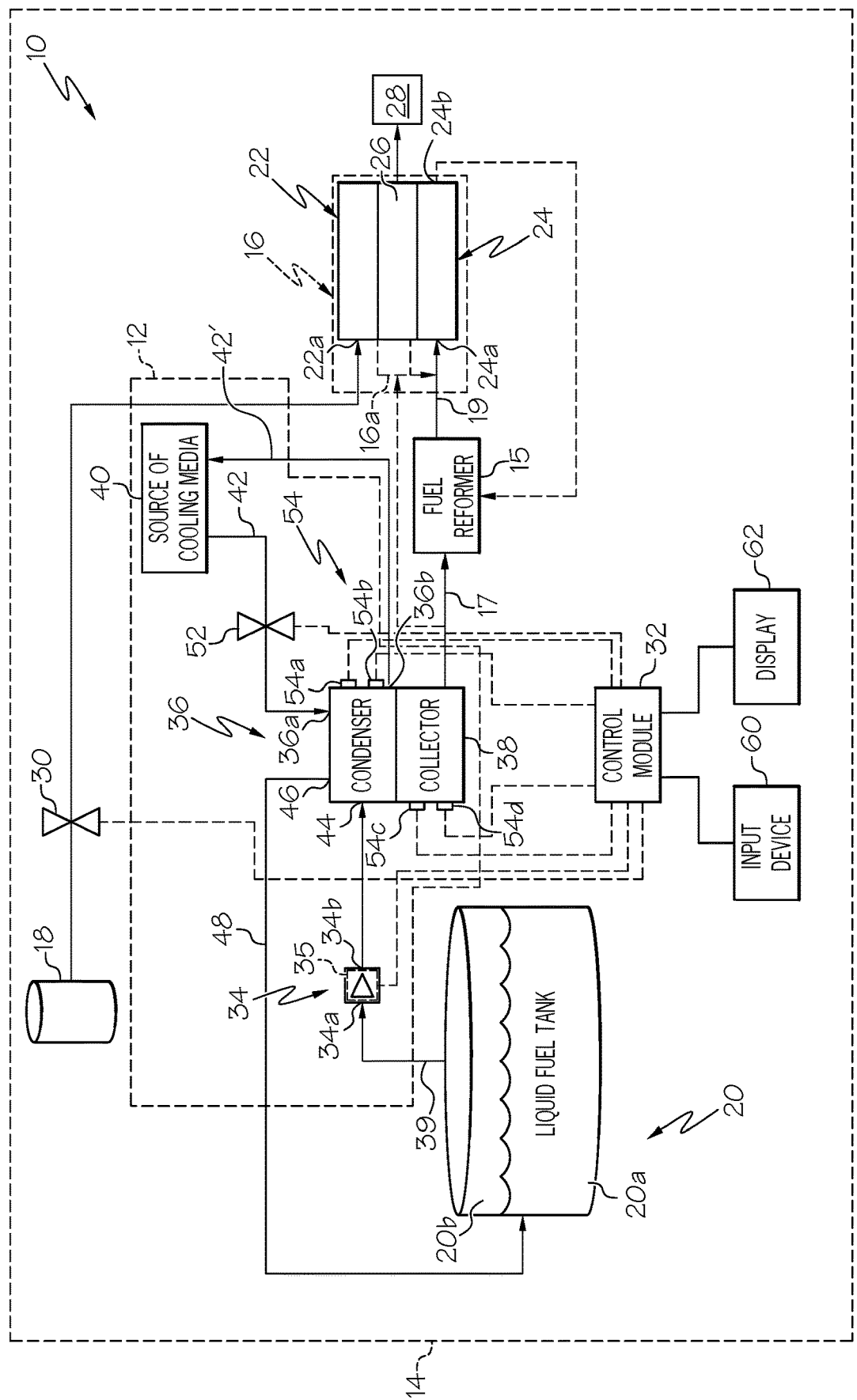
FIG. 1 is a schematic perspective illustration of a fuel cell system that includes a fuel desulfurization system in accordance with various embodiments.

The following detailed description is merely exemplary in nature and is not intended to limit the application and uses. Furthermore, there is no intention to be bound by any expressed or implied theory presented in the preceding technical field, background, brief summary or the following detailed description. In addition, those skilled in the art will appreciate that embodiments of the present disclosure may be practiced in conjunction with any system requiring desulfurization of a fuel, and that the fuel cell system described herein is merely one exemplary embodiment for a fuel desulfurization system of the present disclosure. Moreover, while the fuel desulfurization system is described herein as being used with a fuel cell system onboard a mobile platform, such as a bus, motorcycle, train, motor vehicle, marine vessel, aircraft, rotorcraft and the like, the various teachings of the present disclosure can be used with a stationary fuel cell system as well. In addition, as used herein "desulfurized fuel" is intended to mean fuel with a reduced concentration of sulfur and sulfur compounds in parts per million (ppm) as compared to standard, untreated fuel. Further, it should be noted that many alternative or additional functional relationships or physical connections may be present in an embodiment of the present disclosure. As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the mobile platform, such as an aircraft, described herein is merely one exemplary embodiment of the present disclosure.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

With reference to FIG. 1, a fuel cell system 10 is shown. The fuel cell system 10 includes a fuel desulfurization system 12. The fuel cell system 10 may be part of a mobile platform 14, such as a bus, motorcycle, train, motor vehicle, marine vessel, aircraft, rotorcraft and the like. In the following example, the mobile platform 14 is described herein as being an aircraft; however, it will be appreciated that the present teachings of the present disclosure can be applied to any suitable mobile platform and/or stationary fuel cell system. As will be discussed, the fuel desulfurization system 12 desulfurizes, removes or reduces a concentration of sulfur or sulfur compounds, such as benzothiophene and ibenzothiophene, from a source of fuel. Although the figures shown herein depict an example with certain arrangements of elements, additional intervening elements, devices, features, or components may be present in an actual embodiment. It should also be understood that FIG. 1 is merely illustrative and may not be drawn to scale.

With continued reference to FIG. 1, the fuel cell system 10 includes a fuel reformer 15, a fuel cell stack 16, a gas source 18, a source of fuel or fuel source 20 and the fuel desulfurization system 12. Although the fuel reformer 15, the fuel cell stack 16, the gas source 18, the fuel source 20 and the fuel desulfurization system 12 are illustrated herein as being contained within or located onboard the mobile platform 14, it will be understood that one or more of the gas source 18, the fuel source 20 and the fuel desulfurization system 12 may be located remote from the mobile platform 14, if desired.

The fuel reformer 15 is downstream from the fuel desulfurization system 12, and upstream from the fuel cell stack 16. The fuel reformer 15 comprises a reformer for fuel received from the fuel desulfurization system 12, and in one example, the fuel reformer 15 comprises a steam reformer or autothermal reformer. It should be noted that the example of a steam reformer or autothermal reformer are merely exemplary, as the fuel reformer 15 can comprise any suitable reformer. The fuel reformer 15 has an inlet in fluid communication with the fuel desulfurization system 12 to receive a hydrogen containing fuel or hydrocarbon based fuel with a reduced sulfur content via a conduit 17. Generally, the fuel reformer 15 includes a catalyst to facilitate the chemical reaction between a reactant and the hydrogen containing fuel or hydrocarbon based fuel and generate additional amounts of hydrogen, thereby creating a hydrogen enriched fuel or hydrogen enriched gases for the fuel cell stack 16.

For example, in the embodiment of a steam reformer, the fuel reformer 15 includes a base metal catalyst, which can be contained in a housing associated with the fuel reformer 15. The catalyst can be disposed in the housing in any suitable fashion to facilitate the chemical reaction between the steam and the hydrogen containing fuel or hydrocarbon based fuel from the fuel desulfurization system 12, and in one example, the catalyst forms a reactant bed, over which the steam and fuel mixture flows. The reaction between the steam and hydrogen containing fuel or hydrocarbon based fuel converts the fuel into hydrogen ($H_2$), carbon monoxide (CO) and carbon dioxide ($CO_2$), thereby generating hydrogen enriched, reduced sulfur content gases for the fuel cell stack 16. The fuel reformer 15 includes an outlet in fluid communication with the anode inlet 24a of the fuel cell stack 16 to provide the anode 24 with the hydrogen enriched fuel or hydrogen enriched gases via a conduit 19. It should be noted that while not illustrated herein, the fuel reformer 15 may be coupled to a source of water to generate the steam or to a source of steam.

The fuel cell stack 16 may comprise any suitable fuel cell stack 16. In one example, the fuel cell stack 16 comprises a proton exchange or polymer electrolyte membrane (PEM) fuel cell stack 16. It should be noted that the example of a PEM fuel cell stack 16 is merely exemplary, as the fuel cell stack 16 can comprise any suitable fuel cell stack 16, including, but not limited to, a solid oxide fuel cell stack. Generally, in the example of a PEM fuel cell stack, the fuel cell stack 16 includes a cathode 22 and an anode 24, which are separated by an electrolyte, such as a polymer electrolyte membrane 26. The fuel cell stack 16 also optionally includes an internal fuel reformer 16a, which generates a hydrogen rich gases for use by the anode 24. The internal fuel reformer 16a comprises any suitable internal reformer for use with a fuel cell stack, such as a steam reformer or autothermal reformer. The internal fuel reformer 16a also receives fuel from the fuel desulfurization system 12, and converts the received fuel to generate a hydrogen enriched fuel or hydrogen enriched gases for use by the anode 24. The hydrogen enriched gases are provided from the internal fuel reformer 16a of the fuel cell stack 16 to the anode inlet 24a for use by the fuel cell stack 16.

The cathode 22 includes a cathode inlet 22a and a cathode outlet 22b. The cathode 22 is in communication with the gas source 18 to receive gas at the cathode inlet 22a. In one example, the gas is air, however, it should be noted that any suitable gas may be supplied by the gas source 18 to the cathode inlet 22a of the cathode 22 for reaction within the fuel cell stack 16. The anode 24 includes an anode inlet 24a and an anode outlet 24b. The anode inlet 24a is in communication with the fuel reformer 15 and/or the internal fuel reformer 16a to receive hydrogen enriched fuel or hydrogen enriched gases with a reduced sulfur content, as will be discussed in greater detail herein.

Generally, the catalysts on the anode 24 and the cathode 22 facilitate an electrochemical reaction between oxygen in the gas received at the cathode inlet 22a from the gas source 18 and hydrogen in the fuel received at the anode inlet 24a from the fuel reformer 15 and/or internal fuel reformer 16a. Generally, the fuel cell stack 16 is in fluid communication with or is directly fluidly coupled to a reformer, such as the fuel reformer 15 and/or the internal fuel reformer 16a. The electrochemical reaction results in electrical energy, which is conducted from the fuel cell stack 16 to one or more electrical consumers 28 located downstream from the fuel cell stack 16 through suitable transmission components (e.g. electrical wires) as known to those skilled in the art. For example, the fuel cell stack 16 provides electrical power to one or more systems associated with the mobile platform 14, such as heating and cooling system components (e.g. environmental control system), start-up components, etc. Thus, the term "consumers" is understood to mean any device or component in communication with or downstream from the fuel cell stack 16 that receives electrical energy from the fuel cell stack 16 to drive, power or operate the particular component. The cathode outlet 22b receives water generated by the electrochemical reaction at the cathode 22, and the anode outlet 24b receives the remaining hydrogen enriched gases from the electrochemical reaction. The cathode outlet 22b may be in communication with one or more systems to condense the water for use onboard the mobile platform 14. The anode outlet 24b may be in communication with the fuel reformer 15 such that any remaining fuel is conducted back to the fuel reformer 15 to be used by the fuel reforming process.

The gas source 18 is in communication with the cathode inlet 22a of the fuel cell stack 16 to supply the fuel cell stack 16 with a gas, such as an oxygen rich gas or oxygen. In one example, the gas source 18 is a source of air; however, the gas source 18 may comprise any suitable supply of gas for use with the fuel cell stack 16. The gas source 18 may comprise air received from the surroundings of the mobile platform 14, such as air contained within the mobile platform 14 or air drawn in from the environment surrounding the mobile platform 14. For example, in the embodiment of an aircraft, the gas source 18 may comprise air drawn in from the environment (e.g. ram air) or may comprise air from within a fuselage of the aircraft. Moreover, the gas source 18 may comprise a source of compressed oxygen, which can be stored onboard the mobile platform 14. The gas source 18 may also optionally include a valve or cathode valve 30, if desired, to control the flow of gas from the gas source 18 to the fuel cell stack 16. In one example, the cathode valve 30 can comprise an electrically actuatable one-way valve, which may be in communication with a control module 32 associated with the fuel desulfurization system 12. The cathode valve 30 is actuatable to move between a first, opened position to allow the flow of gas from the gas source 18 and a second, closed position to prevent the flow of gas from the gas source 18 based on one or more control signals received from the control module 32.

The fuel source 20 is in communication with the fuel desulfurization system 12. The fuel source 20 comprises any suitable source of hydrogen containing or hydrocarbon based fuel. In one example, the fuel source 20 is disposed within the mobile platform 14, and comprises a fuel tank, which is filled or fillable with a suitable hydrogen containing fuel. In the example of an aircraft as the mobile platform 14, the fuel source 20 comprises one or more of the wing mounted fuel tanks and/or center tanks associated with the aircraft. The fuel contained in the fuel source 20 comprises at least amounts of hydrogen, generally in the form of hydrocarbons, and sulfur or sulfur compounds, for example, in the form of benzothiophene. In one example, the fuel source 20 comprises a source of jet fuel. Exemplary jet fuels can comprise Jet A, Jet A-1 and Jet B. In certain instances, jet fuel may comprise up to 3000 parts per million (ppm) of sulfur or sulfur containing compounds. In order to optimize the performance of the fuel reformer 15 and/or the internal fuel reformer 16a, and thus, the fuel cell stack 16, the fuel source 20 is in communication with the fuel desulfurization system 12 to remove or reduce the amount of sulfur or sulfur containing compounds, such as benzothiophene, in the fuel prior to the fuel entering the fuel reformer 15 and/or internal fuel reformer 16a.

Generally, the fuel source 20 may be characterized as having a first portion 20a filled with a liquid fuel or fuel in a liquid phase, and a second portion 20b filled with a fuel vapor or fuel in a gaseous phase. In the example of jet fuel, as sulfur or sulfur compounds are generally less volatile than hydrocarbon compounds, such as octane compounds, the second portion 20b filled with fuel vapor has lower sulfur and sulfur compounds than the liquid fuel in the first portion 20a of the fuel source 20. By drawing the fuel vapor from the second portion 20b of the fuel source 20, the fuel desulfurization system 12 may produce a liquid fuel for use by the fuel reformer 15 and/or the internal fuel reformer 16a that has a substantially lower sulfur and sulfur compound concentration.

The fuel desulfurization system 12 includes a blower 34, a fuel condenser 36, a fuel collector 38, a source of cooling media 40 and the control module 32. The blower 34 is in fluid communication with the fuel source 20 at an inlet 34a, and is in fluid communication with the fuel condenser 36 at an outlet 34b. Generally, the blower 34 is coupled to the fuel source 20 such that the blower 34 is in fluid communication with the fuel vapor that exists in the second portion 20b. The blower 34 may comprise a suitable fan or other air moving device that is operable to draw in fuel vapor from the fuel source 20 and direct a flow of fuel vapor to the fuel condenser 36. For example, the blower 34 may comprise a centrifugal fan having a plurality of fan blades (not shown) and a motor 35. The blower 34 is also operatively coupled to the control module 32. In one example, the motor 35 of the blower 34 is responsive to one or more control signals from the control module 32 to operate, thereby drawing fuel vapor up from the fuel source 20 and directing the fuel vapor to the fuel condenser 36.

The fuel condenser 36 is in fluid communication with the blower 34 to receive the fuel vapor from the fuel source 20. The fuel condenser 36 is also in fluid communication with the source of cooling media 40 to receive a cooling media, such as a cooling fluid 42, and is in fluid communication with the fuel collector 38. The fuel condenser 36 may comprise a suitable condenser, which allows heat transfer between the cooling fluid 42 and the fuel vapor to condense at least a portion of the fuel vapor into liquid fuel. For example, the fuel condenser 36 may comprise a surface condenser, a shell and tube heat exchanger, etc.

The fuel condenser 36 receives the cooling fluid 42 at an inlet 36a via a conduit 39. The cooling fluid 42 circulates or flows through the fuel condenser 36 and warmed cooling fluid 42' (i.e. cooling fluid 42 that has been used to condense the fuel vapor) exits the fuel condenser 36 at an outlet 36b. The outlet 36b is in fluid communication with the source of the cooling media 40 to return the warmed cooling fluid 42' to the source of cooling fluid 42 for further processing. The fuel vapor is received from the blower 34 at a vapor inlet 44. The heat transfer between the fuel vapor and the cooling fluid 42 condenses at least a portion of the cooling fluid 42, which results in a liquid fluid that is collected by the fuel collector 38.

The fuel condenser 36 also includes an outlet 46, which is in fluid communication with the fuel source 20. The outlet 46 is in communication with a conduit 48, which directs uncondensed fuel vapor from the fuel condenser 36 back to the fuel source 20. In this regard, due to the vapor flow rate of the blower 34 and other factors, the fuel vapor received via the vapor inlet 44 may not all be condensed by the fuel condenser 36. The cooled, uncondensed fuel vapor is directed from the outlet 46 via the conduit 48 to the fuel source 20. As at least a portion of the fuel vapor is condensed by the fuel condenser 36, the uncondensed fuel vapor that returns to the fuel source 20 has a lower fuel content than the fuel vapor that flows initially through the conduit 39. Moreover, by introducing cooled, uncondensed lower fuel content vapor into the fuel source 20, the cooled, uncondensed lower fuel content vapor serves to assist in inerting the fuel source 20. It should be noted that while not illustrated herein, a blower may be coupled to the outlet 46 of the fuel condenser 36 to assist in drawing the uncondensed fuel vapor from the fuel condenser 36 through the conduit 48 back to the fuel source 20.

The fuel collector 38 is in fluid communication with the fuel condenser 36 to receive the condensed liquid fuel from the fuel condenser 36. The fuel collector 38 may comprise any suitable collection device, such as a sloped plate, funnel or other conduit, which collects the liquid fuel condensed by the fuel condenser 36. The fuel collector 38 includes an outlet 38a, which is in fluid communication with the fuel reformer 15 and/or the internal fuel reformer 16a via the conduit 17. The fuel collector 38 directs the liquid fluid received from the fuel condenser 36 and directs the liquid fuel via the conduit 17 to the fuel reformer 15 and/or internal fuel reformer 16a. The fuel collector 38 may be coupled to the fuel condenser 36 in any suitable manner to facilitate the collection of the liquid fuel from the fuel condenser 36, and may be integrally formed with the fuel condenser 36.

The source of cooling media 40 may comprise a suitable source of a cooling medium, which is capable of reducing a temperature of the fuel vapor as the fuel vapor passes through the fuel condenser 36. In one example, the source of cooling media 40 provides the cooling fluid 42, which is capable of reducing the temperature of the fuel vapor by about 10 degrees Fahrenheit (F) to about 30 degrees Fahrenheit (F) relative to an initial temperature of the fuel within the fuel source 20. In one example, an initial temperature of the fuel within the fuel source 20 is about 54 degrees Celsius (C). It should be noted that the use of the cooling fluid 42 is merely exemplary, as the source of cooling media 40 may comprise any suitable cooling medium, such as a cooling solid, etc.

Generally, the source of cooling media 40 is located onboard the mobile platform 14, or onboard the aircraft. It should be noted, however, that the source of cooling media 40 may be external to the mobile platform 14. In one example, the source of cooling media comprises a cold air exhaust line from an environmental control system of the mobile platform 14. In this regard, the environmental control system of the mobile platform 14 may control a temperature within a cabin of the mobile platform 14. The environmental control system may include an air cycle machine, which generates cold air. In this example, the source of cooling media 40 comprises a portion of the cold air downstream from the air cycle machine, which is directed into the inlet 36a upon operation of a cooling valve 52. The cooling valve 52 comprises an electrically actuatable valve operatively coupled to the control module 32 and responsive to one or more control signals from the control module 32 to move between a first, opened position and a second, closed position. In this example, the cooling valve 52 may comprise a temperature control valve associated with the environmental control system. Moreover, the fuel condenser 36 or the fuel desulfurization system 12 can be part of an integrated thermal management system onboard the mobile platform 14.

In one embodiment, the source of cooling media 40 comprises a vapor cycle cooling system onboard the mobile platform 14. In this example, the vapor cycle cooling system includes a refrigerant, which passes through low pressure gas to high pressure liquid to low pressure liquid to low pressure gas states continuously as it circulates through the vapor cycle cooling system. In this regard, the vapor cycle cooling system generally includes a compressor, a condenser, a dryer, an expansion valve and an evaporator, which are arranged to form a closed loop. In one example, the cooling valve 52 is coupled downstream from the evaporator to enable a portion of the refrigerant from the vapor cycle cooling system to flow through the fuel condenser 36 and cool the fuel vapor to result in condensed liquid fuel. In one example, the cooling valve 52 is located downstream from the evaporator, such that the cooling fluid 42 comprises low pressure gas that evaporates as it passes through the fuel condenser 36 to cool the fuel vapor received from the blower 34.

In another embodiment, the source of cooling media 40 comprises a refrigerant source located onboard the mobile platform 14. For example, the source of cooling media 40 comprises a source of R-134a refrigerant, R-407c refrigerant, etc.

It should be understood that while the source of cooling media 40 has been described and illustrated herein as being separate from the fuel condenser 36, in certain examples, the source of cooling media 40 may be part of the fuel condenser 36. Stated another way, while the source of cooling media 40 has been described herein as a source provided from another system or component associated with the mobile platform 14, the fuel condenser 36 itself may be a self-contained cooling system such that the source of cooling media 40 may comprise a vapor cycle system, in which the fuel vapor is directed by the blower 34 and condensed by a condenser of the vapor cycle system. Thus, the fuel condenser 36 and the source of cooling media 40 need not be from separate systems onboard the mobile platform 14, but may comprise an individual or discrete cooling system (e.g. vapor cycle system, air cycle machine system, vapor compression refrigeration system, etc.) that only cools the fuel vapor provided by the blower 34.

In addition, the source of cooling media 40 can comprise ambient air provided by a separate air blower or air source. In this example, the blower 34 may compress the fuel vapor to a higher pressure. Under the higher pressure, the ambient air temperature is adequate to condense at least part of the fuel vapor provided by the blower 34 to the fuel condenser 36 into liquid fuel. As a further alternative, the blower 34 can be coupled with an expansion device, e.g. gas turbine, and a motor. In this example, the expanded gas from the expansion device comprises the source of cooling media 40 to cool down and condense at least a portion of the fuel vapor from the blower 34. It should understood that the gas compression/expansion cycle process described herein, which utilizes a gas turbine, may comprise any suitable gas compression/expansion cycle process, and thus, the gas compression/expansion cycle described herein is merely an example.

In certain embodiments, one or more sensors 54 observe and measure conditions associated with the fuel cell system 10 and generate sensor signals based thereon. In one example, the one or more sensors 54 comprise a pressure sensor 54a and a temperature sensor 54b. The pressure sensor 54a observes and measures a pressure associated with or within the fuel condenser 36 (e.g. an operating pressure of the fuel condenser 36), and generates sensor signals based thereon. The temperature sensor 54b observes and measures a temperature associated with or within the fuel condenser 36 (e.g. an operating temperature of the fuel condenser 36) and generates sensor signals based thereon. It should be noted that one or more sensors 54 may also be associated with the fuel collector 38. For example, a level sensor 54c may observe a level of fluid within the fuel collector 38 and generate sensor signals based thereon. The sensor signals from the level sensor 54c are received by the control module 32 and used to control a temperature of the fuel collector 38 to ensure that there is a sufficient fuel supply for the fuel reformer 15 and/or internal fuel reformer 16a. As a further example, a temperature sensor 54d observes and measures a temperature associated with or within the fuel collector 38 and generates sensor signals based thereon. In certain embodiments, the temperature of the fuel collector 38 is used to determine a quality of the fuel within the fuel collector 38. The signals from the temperature sensor 54d and the determined quality of fuel may be used to monitor the operation of the fuel cell system 10. The one or more sensors 54 are in communication with the control module 32 over a suitable architecture that facilitates the transfer of data and/or power, such as a bus.

In various embodiments, the control module 32 generates the one or more control signals for the cathode valve 30 and the cooling valve 52 based on user input received from an operator. In one example, an input device 60 is manipulable by an operator of the fuel cell system 10 to generate user input. In various embodiments, the user input may include a command to start or stop the operation of the fuel cell system 10. The input device 60 may be implemented as a keyboard (not separately shown), a microphone (not separately shown), a touchscreen layer associated with or as part of a display 62, a switch, a button or other suitable device to receive data and/or commands from the user. Of course, multiple input devices 60 can also be utilized. The display 62 may comprise any suitable display device or other output device. The display 62 may be implemented as a flat panel display or other display type that is integrated with an instrument panel of the mobile platform 14. The display 62, however, may also comprise a hand held device or portable electronic device in communication with the control module 32. The display 62 comprises any suitable technology for displaying information, including, but not limited to, a liquid crystal display (LCD), organic light emitting diode (OLED), plasma, or a cathode ray tube (CRT). Those skilled in the art realize other techniques to implement the display 62 in the mobile platform 14. It should be noted that the input device 60, the display 62 and the control module 32 may be implemented in various ways, and may be in communication with the cathode valve 30, the cooling valve 52, the fuel reformer 15, the fuel cell stack 16 and/or the fuel desulfurization system 12 over a suitable architecture or arrangement that facilitates the transfer of data, commands, power, etc.

The control module 32 receives input data from the input device 60, and outputs one or more control signals to the cathode valve 30 to control the position of the cathode valve 30 based on the input data from the input device 60. The control module 32 receives input data from the input device 60 and outputs one or more control signals to the cooling valve 52 to control the position of the cooling valve 52 based on the input data. The control module 32 receives input data from the input device 60 and outputs one or more control signals to the blower 34 to control the operation of the blower 34 based on the input data. The control module 32 also receives the sensor signals from the one or more sensors 54. Based on the sensor signals, the control module 32 also outputs an error notification. In one example, the error notification is output for display on the display 62 associated with the fuel cell system 10.

Figure 2:
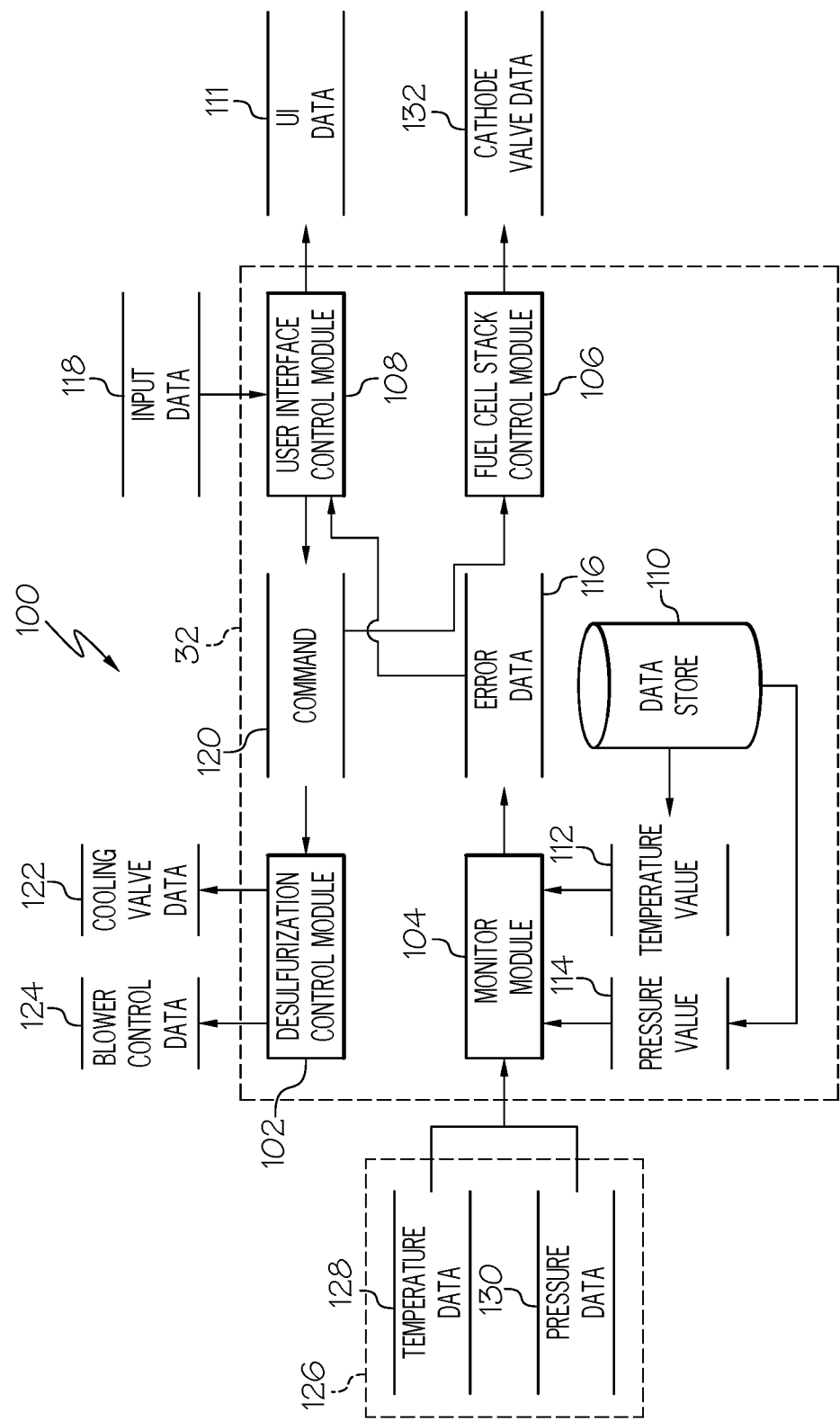
FIG. 2 is a dataflow diagram illustrating a control system of the fuel cell system of FIG. 1 in accordance with various embodiments.

Referring now to FIG. 2, and with continued reference to FIG. 1, a dataflow diagram illustrates various embodiments of a control system 100 embedded within the control module 32. Various embodiments of the control module 32 according to the present disclosure may include any number of sub-modules embedded within the control module 32. As can be appreciated, the sub-modules shown in FIG. 2 may be combined and/or further partitioned to similarly control the cathode valve 30, the cooling valve 52 and the blower 34, and to output error notification. Inputs to the system can be received from the one or more sensors 54, received from the input device 60, received from other control modules (not shown), and/or determined/modeled by other sub-modules (not shown) within the control module 32. In various embodiments, the control module 32 includes a desulfurization control module 102, a monitor module 104, a fuel cell stack control module 106, a user interface (UI) control module 108 and a data store 110.

The data store 110 stores one or more values regarding the operation of the fuel desulfurization system 12. In one example, the data store 110 provides temperature values 112 for desired operating temperatures of the fuel condenser 36 and pressure values 114 for desired operating pressures within the fuel condenser 36. Generally, the temperature values 112 and/or the pressure values 114 comprise a temperature range and a pressure range (e.g. a minimum and a maximum), respectively, for the operation of the fuel desulfurization system 12. In one example, the temperature values 112 and the pressure values 114 are all preset values, which are stored in the data store 110. It should be understood, however, that one or more of the temperature values 112 and the pressure values 114 may be set or received by an operator via the input device 60. Moreover, the temperature values 112 and/or the pressure values 114 may be stored as look-up tables, which are indexed based on a type of fuel condenser 36 employed with the fuel desulfurization system 12.

The UI control module 108 generates user interface data 111 that may be used by the display 62 to display an error notification. In one example, the UI control module 108 generates the user interface data 111 based on error data 116 received as input from the monitor module 104. The error data 116 comprises an error notification regarding the operation of the fuel desulfurization system 12. The UI control module 108 also receives input data 118 based on an operator's input to the input device 60 (FIG. 1). In one example, the input data 118 comprises a command 120 for the operation of the fuel cell system 10 and/or fuel desulfurization system 12. For example, the input data 118 comprises a start command or a stop command for the operation of the fuel cell system 10 and/or the fuel desulfurization system 12. The UI control module 108 interprets the input data 118 and provides the command 120 for the desulfurization control module 102. The input data 118 may also comprise one or more acceptable values for the operation of the fuel desulfurization system 12, such as the temperature values 112 and/or the pressure values 114.

The desulfurization control module 102 receives as input the command 120. Based on the command 120, the desulfurization control module 102 outputs cooling valve data 122. The cooling valve data 122 comprises one or more control signals to move the cooling valve 52 between the first, opened position and the second, closed position. On receipt of the command 120 indicating a request for a start-up of the fuel desulfurization system 12 and/or the fuel cell system 10, the desulfurization control module 102 outputs the cooling valve data 122 to move the cooling valve 52 to the first, opened position. On receipt of the command 120 indicating a request for shut down of the fuel desulfurization system 12 and/or the fuel cell system 10, the desulfurization control module 102 outputs the cooling valve data 122 to move the cooling valve 52 to the second, closed position.

Based on the command 120, the desulfurization control module 102 also outputs blower control data 124. The blower control data 124 comprises one or more control signals for the motor 35 of the blower 34. Stated another way, the blower control data 124 comprises one or more control signals for the motor 35 to operate the blower 34 and thereby draw fuel vapor from the fuel source 20. The one or more control signals may comprise a current directed from the control module 32 to the motor 35, which sets a speed for the operation of the motor 35 of the blower 34.

The monitor module 104 receives as input sensor data 126. In one example, the sensor data 126 comprises temperature data 128 and pressure data 130. The temperature data 128 comprises sensor signals or sensor data from the temperature sensor 54b. Stated another way, the temperature data 128 comprises the temperature within the fuel condenser 36 as measured and observed by the temperature sensor 54b. Based on the temperature data 128, the monitor module 104 accesses the data store 110 and retrieves the temperature values 112. Based on a comparison between the temperature data 128 and the temperature values 112, the monitor module 104 generates or sets the error data 116 for the UI control module 108. In one example, the monitor module 104 sets the error data 116 based on the temperature data 128 observed by the temperature sensor 54b being outside of a default temperature range as indicated in the temperature values 112. The default temperature range associated with the fuel condenser 36 varies based on the design and operating conditions associated with the fuel condenser 36. In one example, the default temperature range is about 20 degrees Celsius (C) to about a temperature lower than a saturation temperature for the fuel at the operating pressure within the fuel condenser 36.

The pressure data 130 comprises sensor signals or sensor data from the pressure sensor 54a. Stated another way, the pressure data 130 comprises the pressure within the fuel condenser 36 as measured and observed by the pressure sensor 54a. Based on the pressure data 130, the monitor module 104 accesses the data store 110 and retrieves the pressure values 114. Based on a comparison between the pressure data 130 and the pressure values 114, the monitor module 104 generates or sets the error data 116 for the UI control module 108. In one example, the monitor module 104 sets the error data 116 based on the pressure data 130 observed by the pressure sensor 54a being outside of a default pressure range as indicated in the pressure values 114. The default pressure range associated with the fuel condenser 36 varies based on the design and operating conditions associated with the fuel condenser 36. In one example, the default pressure range is about 5.0 pounds per square inch (psi) above ambient pressure.

The fuel cell stack control module 106 receives as input the command 120. Based on the command 120, the fuel cell stack control module 106 outputs cathode valve data 132. The cathode valve data 132 comprises one or more control signals to move the cathode valve 30 between the first, opened position and the second, closed position. On receipt of the command 120 indicating a request for start-up, the fuel cell stack control module 106 outputs the cathode valve data 132 to move the cathode valve 30 to the first, opened position. On receipt of the command 120 indicating a request for shut down, the fuel cell stack control module 106 outputs the cathode valve data 132 to move the cathode valve 30 to the second, closed position.

Figure 3:
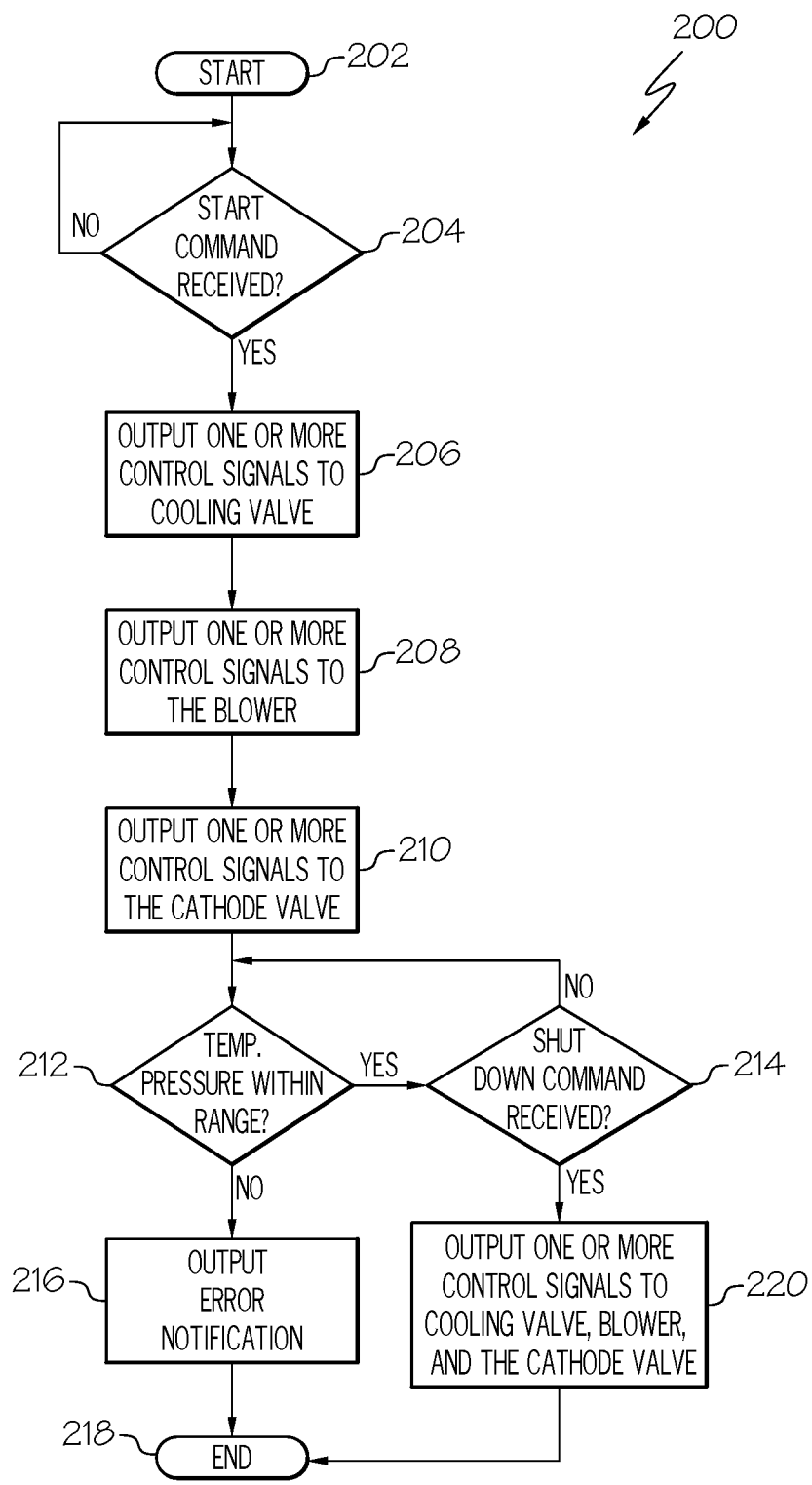
FIG. 3 is a flowchart illustrating a control method of the fuel cell system of FIG. 1 in accordance with various embodiments.

Referring now to FIG. 3, and with continued reference to FIGS. 1-2, a flowchart illustrates a control method that can be performed by the control module 32 of FIGS. 1-2 in accordance with the present disclosure. As can be appreciated in light of the disclosure, the order of operation within the method is not limited to the sequential execution as illustrated in FIG. 3, but may be performed in one or more varying orders as applicable and in accordance with the present disclosure.

In various embodiments, the method may be scheduled to run based on predetermined events, and/or may run based on the command 120 from the input data 118.

With reference to FIG. 3, a method 200 for the fuel cell system 10 is shown. The method begins at 202. At 204, the method determines whether a start-up command 120 has been received via the input device 60. If the start-up command 120 has been received, the method proceeds to 206. Otherwise, the method continues with monitoring for the start-up command 120.

At 206, the method outputs the one or more control signals (i.e. cooling valve data 122) to the cooling valve 52 to move the cooling valve 52 to the first, opened position. In the first, opened position, cooling fluid 42 flows from the source of cooling media 40 to the fuel condenser 36. At 208, the method outputs the one or more control signals (i.e. blower control data 124) to the motor 35 of the blower 34 to drive the fan blades associated with the blower 34. The operation of the blower 34 draws the fuel vapor from the fuel source 20 and directs the fuel vapor into the fuel condenser 36. It should be noted that while blocks 206 and 208 are illustrated herein as being sequential, these may occur substantially simultaneously. Alternatively, the method may output the one or more control signals to the motor 35 of the blower 34 after a predetermined time delay to ensure that the fuel condenser 36 has reached a desired operating temperature, for example.

At 210, the method outputs the one or more control signals (i.e. cathode valve data 132) to the cathode valve 30 to move the cathode valve 30 to the first, opened position. In the first, opened position, air flows from the gas source 18 to the cathode inlet 22a of the fuel cell stack 16.

At 212, the method determines whether a temperature and a pressure within the fuel condenser 36 is within an acceptable range based on the temperature data 128 and the pressure data 130 from the temperature sensor 54b and the pressure sensor 54a. If the temperature and pressure of the fuel condenser 36 is within an acceptable range, the method proceeds to 214. Otherwise, at 216, the method outputs an error notification, which may be displayed on the display 62. The method ends at 218.

At 214, the method determines whether a shutdown command 120 has been received via the input device 60. If the shutdown command has been received, the method proceeds to 220. Otherwise, the method loops to 212.

At 220, the method outputs the one or more control signals (i.e. cooling valve data 122) to the cooling valve 52 to move the cooling valve 52 to the second, closed position; the method outputs the one or more control signals (i.e. blower control data 124) to the motor 35 of the blower 34 to stop the operation of the blower 34; and outputs the one or more control signals (i.e. cathode valve data 132) to the cathode valve 30 to move the cathode valve 30 to the second, closed position. The method ends at 218.

Figure 4:
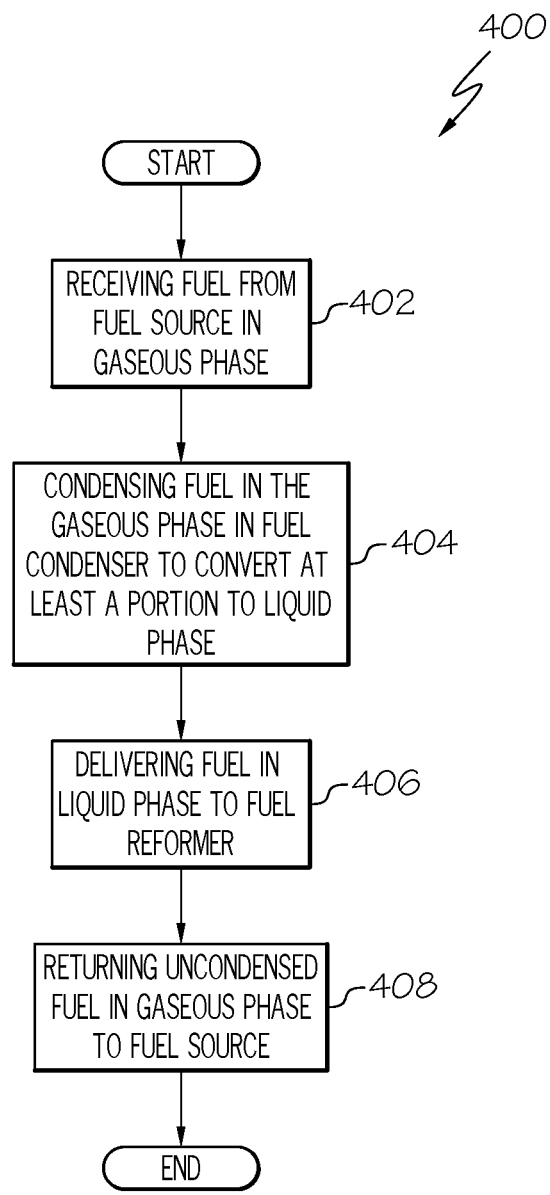
FIG. 4 is a flowchart illustrating a method of fuel desulfurization according to various embodiments.

Thus, the fuel cell system 10 of the various teachings of the present disclosure provides a method for removing sulfur or sulfur compounds from a source of fuel or fuel source 20. With reference to FIG. 4, and continued reference to FIG. 1, a method of desulfurization of a fuel for use by a fuel reformer includes at 402, receiving fuel from the fuel source 20 in a gaseous phase. At 404, the method includes condensing the fuel in the gaseous phase in the fuel condenser 36 to convert at least a portion of the fuel into a liquid phase. The method includes at 406, delivering the fuel in the liquid phase directly to the fuel reformer 15 and/or internal fuel reformer 16a, and returning the uncondensed portion of the fuel in the gaseous phase to the fuel source 20 to inert the fuel source 20.

In one example, with a temperature of the fuel condenser 36 operating at a temperature of about 10 degrees Fahrenheit (F) below a temperature of the fuel source 20, a pressure of the fuel condenser 36 of about 14.7 pounds per square inch absolute (psia) and an inlet fuel vapor with 1000 parts per million (ppm) of benzothiophene, an amount of benzothiophene in the outlet liquid fuel that exits the fuel collector 38 is about 111 parts per million (ppm) with a fuel vapor condensing fraction of about 0.10 mol. The fuel vapor condensing fraction is the mol of condensate generated from the inlet fuel vapor. Thus, in this example, the fuel condenser 36 reduces the parts per million (ppm) of sulfur in the form of benzothiophene by about 89%. In this example, the temperature of the fuel from the fuel source 20 is about 54 degrees Celsius (C).

In another example, with a temperature of the fuel condenser 36 operating at a temperature of about 20 degrees Fahrenheit (F) below a temperature of the fuel source 20, a pressure of the fuel condenser 36 of about 14.7 pounds per square inch absolute (psia) and an inlet fuel vapor with 1000 parts per million (ppm) of benzothiophene, an amount of benzothiophene in the outlet liquid fuel that exits the fuel collector 38 is about 136 parts per million (ppm) with a fuel vapor condensing fraction of about 0.18 mol. Thus, in this example, the fuel condenser 36 reduces the parts per million (ppm) of sulfur in the form of benzothiophene by about 86%. In this example, the temperature of the fuel from the fuel source 20 is about 54 degrees Celsius (C).

In yet another example, with a temperature of the fuel condenser 36 operating at a temperature of about 30 degrees Fahrenheit (F) below a temperature of the fuel source 20, a pressure of the fuel condenser 36 of about 14.7 pounds per square inch absolute (psia) and an inlet fuel vapor with 1000 parts per million (ppm) of benzothiophene, an amount of benzothiophene in the outlet liquid fuel that exits the fuel collector 38 is about 162 parts per million (ppm) with a fuel vapor condensing fraction of about 0.25 mol. Thus, in this example, the fuel condenser 36 reduces the parts per million (ppm) of sulfur in the form of benzothiophene by about 84%. In this example, the temperature of the fuel from the fuel source 20 is about 54 degrees Celsius (C).

Thus, the foregoing examples illustrate that the fuel desulfurization system 12 successfully reduces the parts per million of sulfur and sulfur compounds, such as benzothiophene, present in the fuel prior to the fuel flowing to the fuel reformer 15 and/or the internal fuel reformer 16a, and thus, the fuel cell stack 16. As illustrated above, by drawing fuel vapor from the fuel source 20 with a lower sulfur content, and condensing the fuel vapor in the fuel condenser 36 into liquid fuel for the fuel reformer 15 and/or internal fuel reformer 16a, the liquid fuel provided to the fuel reformer 15 and/or internal fuel reformer 16a has substantially reduced amounts of sulfur or sulfur compounds in parts per million (ppm). Moreover, the uncondensed fuel vapor that exits the fuel condenser 36 and returns to the fuel source 20 helps inert the fuel source 20 due to the lower or reduced concentration of hydrocarbons in the returned, uncondensed fuel vapor.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A method of fuel desulfurization, comprising:
  receiving fuel from a source of fuel in a gaseous phase by drawing the fuel in the gaseous phase from the source of fuel with a blower in communication with the source of fuel;
  directing, by the blower, the fuel in the gaseous phase to a fuel condenser;
  condensing the fuel in the gaseous phase in the fuel condenser to convert at least a portion of the fuel into a liquid phase;
  delivering the fuel in the liquid phase to a reformer; and
  returning an uncondensed portion of the fuel in the gaseous phase to the source of fuel to inert the source of fuel.

2. The method of claim 1, wherein receiving fuel from the source of fuel in the gaseous phase further comprises:
  receiving a source of input; and
  generating, by a processor, one or more control signals for the blower fluidly coupled between the source of fuel and the fuel condenser to operate the blower based on the input.

3. The method of claim 1, further comprising:
  receiving a cooling fluid from a source of cooling media at the fuel condenser.

4. The method of claim 3, further comprising:
  receiving a source of input; and
  generating, by a processor, one or more control signals for a cooling valve fluidly coupled between the source of cooling media and the fuel condenser to open the cooling valve based on the input.

5. The method of claim 1, further comprising:
  receiving the fuel in the liquid phase by a fuel collector, and directing, by the fuel collector, the fuel in the liquid phase to the reformer.

6. The method of claim 1, wherein the condensing the fuel in the gaseous phase in the fuel condenser further comprises:
  receiving a cooling fluid from a source of cooling media fluidly coupled to the fuel condenser.

7. The method of claim 6, wherein the source of cooling media is an environmental control system onboard an aircraft.

8. The method of claim 6, wherein the source of cooling media is a refrigerant.

9. The method of claim 1, wherein the receiving fuel from the source of fuel in the gaseous phase further comprises:

receiving jet fuel in the gaseous phase from at least one of a wing-mounted fuel tank or center-mounted fuel tank of an aircraft, and the returning the uncondensed portion of the fuel in the gaseous phase further comprises returning the uncondensed portion of the fuel to the at least one of the wing-mounted fuel tank or the center-mounted fuel tank to inert the at least one of the wing-mounted fuel tank or the center-mounted fuel tank.

10. A method of fuel desulfurization, comprising:

receiving jet fuel in a gaseous phase from at least one of a wing-mounted fuel tank or center-mounted fuel tank of an aircraft;

condensing the fuel in the gaseous phase in a fuel condenser to convert at least a portion of the fuel into a liquid phase;

delivering the fuel in the liquid phase to a reformer; and returning an uncondensed portion of the fuel in the gaseous phase to the at least one of the wing-mounted fuel tank or the center-mounted fuel tank to inert the at least one of the wing-mounted fuel tank or the center-mounted fuel tank.

11. The method of claim 10, further comprising:

receiving the fuel in the liquid phase by a fuel collector, and directing, by the fuel collector, the fuel in the liquid phase to the reformer.

12. The method of claim 10, wherein the condensing the fuel in the gaseous phase in the fuel condenser further comprises:

receiving a cooling fluid from a source of cooling media fluidly coupled to the fuel condenser.

13. The method of claim 12, wherein the source of cooling media is an environmental control system onboard an aircraft.

14. The method of claim 12, wherein the source of cooling media is a refrigerant.

15. A method of fuel desulfurization, comprising:

receiving fuel from a source of fuel in a gaseous phase;

condensing the fuel in the gaseous phase in a fuel condenser to convert at least a portion of the fuel into a liquid phase;

delivering the fuel in the liquid phase to a reformer; and returning an uncondensed portion of the fuel in the gaseous phase to the source of fuel to inert the source of fuel, wherein the condensing the fuel in the gaseous phase in the fuel condenser further comprises receiving a cooling fluid from an environmental control system onboard an aircraft fluidly coupled to the fuel condenser.

16. The method of claim 15, further comprising:

receiving the fuel in the liquid phase by a fuel collector, and directing, by the fuel collector, the fuel in the liquid phase to the reformer.

* * * * *